United States Patent Office

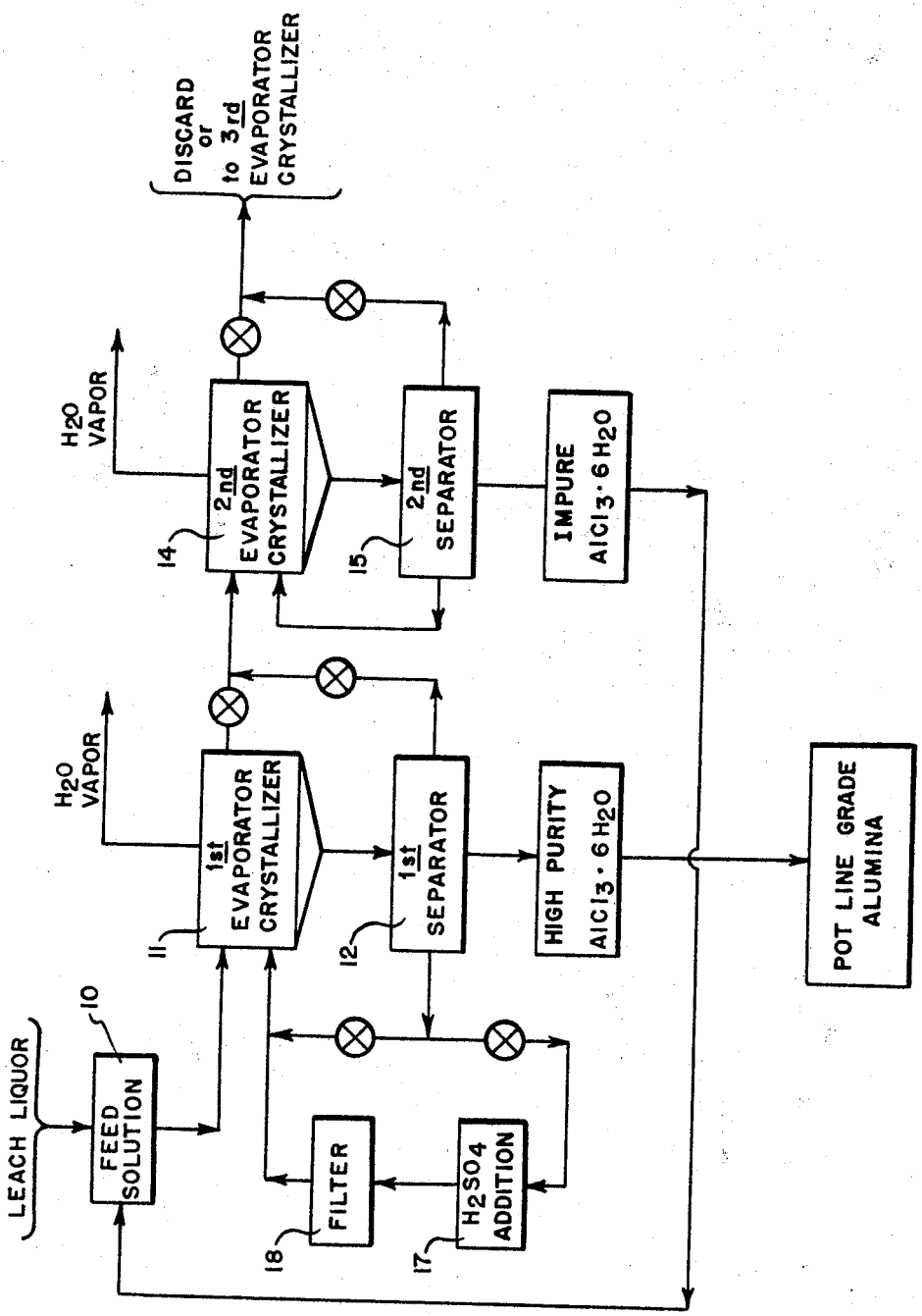

3,446,578
Patented May 27, 1969

3,446,578
PURIFICATION OF ALUMINUM CHLORIDE
Robert E. Sullivan, Anaconda, Mont., assignor to The Anaconda Company, New York, N.Y., a corporation of Montana
Filed Oct. 26, 1966, Ser. No. 589,542
Int. Cl. C01f 7/62
U.S. Cl. 23—92          8 Claims

ABSTRACT OF THE DISCLOSURE

Saturated aqueous solutions of aluminum chloride containing small but significant amounts of dissolved calcium ions (present in the form of calcium chloride) and normally unfilterable particles of titanium dioxide (present as a result of the hydrolysis of titanium tetrachloride) are purified by the precipitation of said calcium ions with sulfuric acid followed by the concurrent removal of the precipitated calcium sulfate with said particles of titanium dioxide by filtration of said solution.

---

This invention relates to the separation and recovery of relatively pure metallic salts from impure aqueous solution of these salts, and more particularly to the recovery of relatively pure crystals of aluminum chloride hexahydrate from an aqueous solution of aluminum chloride containing minor quantities of other metal chlorides.

The conventional electrolytic process for the production of metallic aluminum from alumina requires that the alumina employed as the feed material for the electrolytic cells or pot lines of the process be substantially free of iron, chromium and other harmful contaminants. Pot line grade alumina can be produced from high grade bauxite ores by any of several well known procedures. in addition, aluminum can be extracted from clay (which consists mainly of hydrated aluminum silicates together with a variety of other minerals) by leaching the calcined clay with an acid, for example hydrochloric acid, to obtain water-soluble aluminum salts that are then treated to convert the aluminum content thereof to alumina. However, the acid leaching of clay dissolves other metallic constituents besides aluminum that may be present in the clay. As a consequence, the acid leach liquor obtained is contaminated with corresponding amounts of undesirable metallic salts, such, for example, as iron, chromium, calcium, magnesium, titanium, potassium and other metal chlorides, from which the desired aluminum salt must be separated in relatively pure form if an acceptable pot line grade alumina is to be prepared therefrom.

In one recently developed process for the production of pot line grade alumina from clay, calcined clay is leached with hydrochloric acid to obtain an acid leach liquor containing aluminum chloride, a moderate amount of ferric chloride and relatively minor amounts of calcium chloride, titanium chloride and other metal chlorides. The acid leach liquor is treated with a selective water-insoluble organic reagent or sequestrant that is specific for the iron salt present in the liquor to remove or extract a substantial portion of the ferric chloride content of the leach liquor therefrom. The aluminum chloride-containing leach liquor is then subjected to a novel evaporation and crystallization operation wherein substantially pure crystals of aluminum chloride hexahydrate are precipitated from the leach liquor which advantageously can then be directly converted into pot line grade alumina.

The aforementioned novel evaporation and crystallization operation involves the evaporation of water from an aqueous solution containing aluminum chloride and minor but significant amounts of other metal chlorides, such as iron, chromium, calcium and titanium chlorides, under controlled conditions such that the desired relatively pure crystals of aluminum chloride hexahydrate are precipitated and recovered therefrom. Specifically, the concentration of metal chlorides other than aluminum chloride in the aqueous solution being evaporated (herein referred to as the first mother liquor) is maintained below that concentration at which the crystals of aluminum chloride hexahydrate precipitated therefrom are contaminated with a greater amount of iron and other metal impurities than can be tolerated in the pot line grade alumina produced therefrom. To this end, additional aluminum chloride-containing aqueous feed solution is essentially continuously added to the first mother liquor to replenish the precipitated aluminum chloride hexahydrate, while water is continuously evaporated from the mother liquor to maintain the concentration of aluminum chloride therein at or slightly above that concentration at which the mother liquor is saturated with aluminum chloride. At the same time, a portion of the first mother liquor is essentially continuously withdrawn from the main body of said liquor so that the concentration of chlorides other than aluminum chloride in said main body of the liquor is maintained below that concentration at which a significant amount of said other metal chlorides crystallize and precipitate with, or otherwise contaminate, the aluminum chloride hexahydrate crystals precipitated from the main body of the first mother liquor.

The portion of the first mother liquor substantially continuously withdrawn or bled from the main body of this liquor contains a somewhat greater relative proportion of the unwanted or contaminant metal chlorides than does the initial aluminum chloride-containing feed solution. The bleed portion of the first mother liquor is advantageously subjected to a second evaporation and crystallization step similar to the first such evaporation and crystallization step of the process to obtain a second mother liquor from which are precipitated crystals of aluminum chloride hexahydrate contaminated with minor but significant quantities of these other unwanted metal chlorides. The impure crystals of aluminum chloride hexahydrate thus precipitated are separated from the second mother liquor and then are mixed with the aluminum chloride-containing aqueous feed solution being added to the first mother liquor. A sufficient quantity of the second mother liquor is substantially continuously withdrawn from the main body of said second mother liquor so that the concentration of metal chlorides other than aluminum chloride in the second mother liquor is maintained below that concentration at which the aluminum chloride hexahydrate precipitated therefrom will contain a relative amount of the other, unwanted, metal chlorides in excess of the relative amount of these metal chlorides present in the initial aluminum chloride-containing feed solution.

The quantity of contaminant metal chlorides contained or entrained in the aluminum chloride hexahydrate precipitated from the first mother liquor and from the second mother liquor depends upon the concentration of these contaminant metal chlorides in the first and second mother liquors, respectively. Accordingly, as noted a sufficient quantity of the first mother liquor must be withdrawn or beld from the main body of this liquor so as to maintain the concentration of the contaminant metal salts in the main body of the first mother liquor below that concentration at which the crystals of aluminum chloride hexahydrate precipitated therefrom contain more of the contaminant metal salts than can be tolerated in the pot line grade alumina ultimately produced therefrom. Similarly, the quantity of mother liquor that must be withdrawn or bled from the main body of the second mother liquor must be sufficient to maintain the concentration of contaminant metal chlorides in said second mother liquor below that concentration at which the crystals of aluminum chloride hexahydrate precipitated therefrom will contain a greater proportion of the contaminant metal chlorides than are present in the initial feed solution being introduced into the first evaporation and crystallization step.

For the sake of convenience and of accuracy of control, one of the unwanted contaminant metals in the mother liquor (usually, but not necessarily, the metal whose presence in the purified salt product is least desirable) is selected as the contaminant whose concentration in the mother liquor controls the quantity of liquor that must be continuously withdrawn therefrom in order to prevent the build up of the concentration of the control contaminant in the mother liquor above the maximum that will permit recovery of a crystalline salt product of the desired purity therefrom. For example, if it is desired to recover substantially pure crystals of aluminum chloride hexahydrate from an aqueous solution containing aluminum chloride and minor amounts of ferric chloride and other metal chlorides, the concentration ferric chloride in the mother liquor can be used as the controlling factor in determining the quantity of the mother liquor that must be continuously withdrawn therefrom in order to maintain the concentration of the contaminant metal salts in the mother liquor below the maximum that will result in the recovery of the desired pure aluminum chloride hexahydrate product.

In addition to ferric chloride the mother liquor contains minor quantities of various other contaminant metal salts including, usually, titanium chloride. By the procedure hereinbefore described the concentration of titanium chloride in the first mother liquor can readily be maintained below that concentration at which this contaminant metal salt will precipitate from the liquor along with the aluminum chloride hexahydrate. However, titanium salts hydrolyze very readily, particularly when the pH or acidity of the mother liquor is reduced. As the crystallization process progresses the acidity of the first mother liquor decreases, and as a result the titanium chloride present in the mother liquor hydrolyzes to produce minute particles of titanium dioxide that are suspended in the first mother liquor. The bleeding off of a small portion of the first mother liquor in accordance with the aforementioned procedure will help prevent the titanium dioxide produced as a result of the hydrolysis of titanium chloride from building up rapidly in the first mother liquor. However, the quantity of titanium dioxide particles present in the mother liquor do tend to increase over a period of time to the point where it becomes increasingly difficult to obtain the desired high purity aluminum chloride hexahydrate product substantially free of entrained particles of titanium dioxide. Moreover, as noted, the titanium dioxide particles are very finely divided, and as a result they are difficult to remove from the mother liquor by ordinary filtration techniques. As a consequence, the presence and building up of titanium dioxide in the first mother liquor can become a problem difficult to cope with.

The clay from which the aluminum chloride-containing feed solution is obtained ordinarily contains various calcium compounds, and the concentration of calcium chloride in the first mother liquor depends on the amount of soluble calcium present in the original clay. If the soluble calcium present is relatively low, the concentration of calcium chloride in the first mother liquor can be controlled by bleeding off a portion of the first mother liquor in accordance with procedure hereinbefore described. However, the quantity of soluble calcium in the original clay, and hence in the feed solution, is frequently so great that, in order to maintain the concentration of calcium chloride in the first mother liquor below that concentration at which the crystals of aluminum chloride hexahydrate will be substantially free of calcium chloride, such a large portion of the first mother liquor would have to be withdrawn or bled therefrom that the process becomes uneconomic. As a consequence, in the practice of the process the portion of the first mother liquor withdrawn from the solution being evaporated may be sufficient to maintain the concentration of metal chlorides other than calcium chloride in the main body of the mother liquor below a predetermined maximum concentration, but usually it is not sufficient to prevent the concentration of calcium chloride in the first mother liquor from gradually building up to a quite significant value. Therefore, the gradual increase in the concentration of calcium chloride in the mother liquor also creates a problem difficult to solve economically.

After an extensive investigation of the aforementioned problems, I have now found that the titanium dioxide and calcium chloride concentration of the first mother liquor can be maintained below that concentration at which the crystals of aluminum chloride hexahydrate precipitated therefrom will become contaminated with an excessive quantity of either titanium dioxide or calcium chloride by appropriate treatment of the clarified mother liquor from the separatory step of the first evaporation and crystallization operation. That is to say, in the practice of the foregoing process a portion of the mother liquor is essentially continuously withdrawn from the first mother liquor and is treated to separate and recover the crystals of aluminum chloride hexahydrate therefrom. The clarified portion of the first mother liquor (that is the portion of the mother liquor from which the precipitated crystals of aluminum chloride hexahydrate have been removed by centrifuging or filtration or the like) is then returned to the main body of the first mother liquor. I have found that if a portion of the clarified mother liquor being returned to the first evaporation and crystallization step of the process is treated with sulfuric acid so as to precipitate a substantial portion of the calcium content thereof in the form of calcium sulfate, the precipitated calcium sulfate can then be filtered from the clarified solution by conventional filtration techniques before the clarified solution is returned to the first mother liquor. Moreover, I have further made the surprising discovery that not only is the concentration of the calcium in the first mother liquor reduced to acceptable levels by the aforesaid treatment with sulfuric acid, but in addition the concentration of titanium dioxide is simultaneously reduced to the point whereat the aluminum chloride hexahydrate precipitate is substantially free of this troublesome contaminant.

As a result of the foregoing investigation and discovery I have devised an important improvement in the process wherein crystals of high purity aluminum chloride hexahydrate are precepitated and recovered from an aqueous solution of aluminum chloride containing minor amounts of other metal chlorides including ionized calcium chloride and titanium chloride. As previously described, this process involves evaporating water from the main body of the aforesaid aqueous solution to precipitate crystals of high purity $AlCl_3 \cdot 6H_2O$ therefrom, essentially continuously separating and recovering the precipitated crystals of $AlCl_3 \cdot 6H_2O$ from a portion of the main body of the solution, returning the thus clarified portion of the solution to the evaporation step of the process, essentially continuously adding fresh aluminum chloride-containing solution to the main body of the solution being evaporated, and essentially continuously withdrawing a portion of the solution being evaporated from the main body of said solution so as to maintain the concentration of metal chlorides other than calcium chloride in said main body below a predetermined level. My improvement in this process comprises removing excess calcium ions and titanium dioxide (present in the solution as a result of the hydrolysis of titanium chloride) from the solution by the steps comprising (i) adding sulfuric acid to a portion of the clarified solution being returned to the evaporation step of the process, (ii) filtering said portion of the clarified solution to remove precipitated calcium sulfate and titanium dioxide therefrom and (iii) returning the filtered solution to the main body of the solution being evaporated.

My new process will be better understood from the following description thereof in conjunction with the single figure of the accompanying drawing which is a schematic flow sheet showing the basic procedural steps involved in the process.

As previously described herein, the aluminum content of aluminum containing clays can be extracted therefrom and converted to pot line grade alumina by first treating the calcined clay with hydrochloric acid to obtain an acid leach liquor containing a relatively large quantity of dissolved aluminum chloride, a moderate amount of ferric chloride and relatively minor amounts of a wide variety of other metal chlorides including calcium chloride and titanium chloride. The acid leach liquor is advantageously treated with a selective organic solvent or sequestrant for the iron chloride content thereof, and then is subjected to the novel evaporation and crystallization operation hereinbefore described to precipitate relatively pure crystals of aluminum chloride hexahydrate therefrom. The high purity crystals of aluminum chloride hexahydrate are then calcined or otherwise treated to convert the aluminum content thereof to pot line grade alumina.

In order to obtain crystals of aluminum chloride hexahydrate of sufficiently high purity to be converted into pot line grade alumina, it is essential that the concentration of metal chlorides other than aluminum chloride in the first mother liquor be maintained below that concentration at which the crystals of the aluminum chloride hexahydrate precipitated therefrom contain more of these other, unwanted, metal chlorides than can be tolerated in the pot line grade alumina ultimately produced therefrom. The concentration of the unwanted or contaminant metal chlorides in the first mother liquor can be maintained below the maximum acceptable concentration by withdrawing or bleeding off a portion of the mother liquor as previously described. However, due to the tendency of titanium chloride to hydrolyze to form fine particles of titanium dioxide, and due to the relatively excessive quantities of calcium chloride commonly present in the mother liquor, the concentration of both titanium dioxide and calcium chloride tends to build up in the first mother liquor to the point where it is difficult to obtain aluminum chloride hexahydrate crystals of the requisite purity. The present invention is directed to an improvement in the evaporation and crystallization operation herein described whereby the titanium dioxide and calcium chloride content of the mother liquor are reduced to the point where crystals of aluminum chloride hexahydrate of the required purity are readily obtained.

For convenience, the practice of my improved process for the separation and recovery of relatively pure crystals of aluminum chloride hexahydrate from an aqueous solution containing dissolved aluminum chloride and other metal chlorides will be described in connection with the separation and recovery of said crystals from a solution containing a substantial amount of dissolved aluminum chloride together with minor amounts of dissolved ferric chloride, calcium chloride and titanium chloride. However, it will be understood that what is said with respect to the separation of aluminum chloride from this hypothetical solution applies with equal force to the separation and recovery of aluminum chloride hexahydrate from acidic leach liquors containing minor amounts of a wide variety of other metal chlorides in addition to those specifically mentioned herein.

Referring now to the figure of the drawing, the aqueous feed solution comprising the aforesaid mixture of aluminum chloride, ferric chloride, calcium chloride and titanium chloride is stored in feed solution vessel 10 from which the solution is essentially continuously introduced into the first evaporator-crystallizer 11. The feed solution is concentrated in the first evaporator-crystallizer by the evaporation of water therefrom to obtain a first mother liquor comprising a saturated solution of aluminum chloride from which the desired, relatively pure crystals of aluminum chloride hexahydrate precipitate. The relatively pure crystals of aluminum chloride hexahydrate are withdrawn from the first evaporator-crystallizer in the form of a slurry and are separated from the accompanying mother liquor in a suitable separator apparatus 12 (for example, a centrifuge or filter or the like). The clarified mother liquor extracted from the crystalline salt product is returned to the first evaporator-crystallizer 11 after being treated in accordance with the present invention, and the high purity crystals of aluminum chloride hexahydrate are washed and recovered for subsequent use (for example, for conversion into pot line grade alumina).

Fresh aluminum chloride-containing feed solution is essentially continuously added to the mother liquor in evaporator-crystallizer 11 to replenish the aluminum chloride hexahydrate being precipitated and removed therefrom. As water is continuously being evaporated from the mother liquor in the evaporator-crystallizer 11 in order to maintain the concentration of aluminum chloride in the liquor at or slightly above that concentration at which the mother liquor is saturated with aluminum chloride, the concentration of ferric chloride in the mother liquor will build up to an unacceptably high level unless an appreciable quantity of the mother liquor is substantially continuously withdrawn from the liquor in the first evaporator-crystallizer 11. As previously described, the amount of mother liquor that is withdrawn or bled from the first evaporator-crystallizer 11 is such that the concentration of ferric chloride in said first evaporator-crystallizer is maintained below that concentration at which an appreciable amount of ferric chloride is caused to precipitate with, or become physically entrapped in, or otherwise contaminate the desired high purity aluminum chloride product of this evaporation and crystallization step. By way of example, if the feed solution contains about 80 grams per liter (g./l.) $Al_2O_3$ (present as aluminum chloride) and about 0.4 g./l. $Fe_2O_3$ (present as ferric chloride), it has been found that about 8.5 liters of concentrated mother liquor must be withdrawn from the first evaporator-crystallizer 11 for every 100 liters of fresh feed solution introduced thereinto in order to prevent the build up of ferric chloride in the first mother liquor above that concentration (that is, above about 5 g./l. $Fe_2O_3$, present as ferric chloride) at which a crystalline aluminum chloride hexahydrate product of the desired purity can be obtained.

The mother liquor withdrawn or bled from the first evaporator-crystallizer 11 is clarified by filtering or centrifuging or otherwise treating the liquor to remove precipitated aluminum chloride hexahydrate and other solids therefrom. The bleed portion of the first mother liquor may be withdrawn directly from the first evaporator-crystallizer 11 and be clarified as described, or the bleed liquor may comprise a portion of the clarified mother liquor from the separator 12 as indicated in the figure of the drawing. The clarified bleed liquor from the first evaporator-crystallizer 11 is introduced into a second evaporator-crystallizer 14 where an additional quantity of water is evaporated and an additional quantity of aluminum chloride hexahydrate is precipitated therefrom. The precipitated crystals of aluminum chloride hexahydrate are separated from the second mother liquor in the separatory apparatus 15, and these crystals are recycled to the start of the process where they are admixed with and dissolved in the feed solution.

It will be evident that, as water is continuously being evaporated from the mother liquor in the second evaporator-crystallizer 14, the crystalline product of the second evaporation and crystallization step of the process will be contaminated with a small but nonetheless appreciably greater quantity of ferric chloride than is present in the crystalline product of the first evaporation and crystallization step. As this crystalline product is added to the feed solution in the vessel 10, it is important that the relative proportion of ferric chloride to aluminum chloride in the crystalline product of the second evaporation and crystallization step be no greater than (and preferably be less than) the relative proportion of ferric chloride to aluminum chloride in the feed solution being introduced into the first evaporator-crystallizer 11. Accordingly, as in the case of the first evaporation and crystallization step, it is again necessary to withdraw or bleed an appreciable quantity of the second mother liquor from the second evaporator-crystallizer 14. By way of example, if the mother liquor in the second evaporator-crystallizer 14 contains not more than about 65 g./l. $Fe_2O_3$ (present as ferric chloride), the crystalline salt product precipitated therefrom will contain slightly less ferric chloride than the relative proportion of this salt that is present in the feed solution being introduced into the first evaporator-crystallizer 11. Moreover, if approximately 2.5 liters of the concentrated mother liquor are withdrawn from the second evaporator-crystallizer 14 for each 100 liters of aluminum chloride-containing feed solution that are added to the first evaporator-crystallizer 11, the concentration of ferric chloride in the mother liquor in the second evaporator-crystallizer 14 will be maintained at about 15 g./l. $Fe_2O_3$ (present as $FeCl_3$) or well below the maximum permissible concentration (namely, below about 65 g./l. $Fe_2O_3$, present as $FeCl_3$) that will produce a crystalline product having an acceptable ferric chloride content.

As previously pointed out, the titanium chloride content of the mother liquor in the first evaporator-crystallizer 11 (and in the second evaporator-crystallizer 14, as well) tends to hydrolyze and, as a result, to form finely divided particles of titanium dioxide that remain suspended in the mother liquor. These fine particles of titanium dioxide are difficult to remove from the mother liquor, and in the course of time they build up to an unacceptable amount. The calcium chloride content of the mother liquor also tends to build up to an unacceptable degree due primarily to the fact that the process would not be economically feasible if sufficient mother liquor had to be bled from the first evaporator-crystallizer to maintain the concentration of calcium therein below that concentration at which the aluminum-chloride hexahydrate precipitate will become contaminated with an excessive quantity of calcium chloride.

In accordance with the practice of my invention a small portion of the clarified mother liquor from the first separator 12 is treated with sulfuric acid to precipitate a substantial portion of the dissolved calcium content of the mother liquor in the form of calcium sulfate. The sulfuric acid can be added to the clarified mother liquor in any suitable manner such as, for example, by introducing the acid directly into the conduit or pipe line through which the clarified mother liquor is flowing, or by introducing the acid into the body of the clarified mother liquor contained in a suitable mixer or reaction vessel 17. The amount of sulfuric acid added to the clarified mother liquor theoretically should be stoichiometrically equivalent to that quantity of acid required to react with all of the calcium present in the portion of the mother liquor being treated. In practice, however, I have found that the quantity of sulfuric acid added to the mother liquor may range anywhere from about 10 percent to about 95 percent of the amount theoretically required to react with all of the calcium present in the mother liquor.

The portion of the mother liquor to which the sulfuric acid has been added now contains crystals of precipitated calcium sulfate which are filtered from the mother liquor by conventional filtration techniques and apparatus 18. For reasons not fully understood, the precipitated calcium sulfate also facilitates removal from the mother liquor of the finely divided particles of titanium dioxide which otherwise would pass through the minute openings in the filter cloth or other filter medium. As a result, the quantity of both calcium ions and titanium dioxide particles present in the mother liquor being returned to the first evaporator-crystallizer 11 is substantially reduced.

It is not necessary to treat all of the clarified mother liquor from the first separator 12 with sulfuric acid in order to maintain the concentration of calcium ions and titanium dioxide in the first mother liquor below acceptable limits. A small portion (say, 10 percent) of the clarified mother liquor from the first separator 12 can be essentially continuously diverted from the main stream of the mother liquor being returned to the first evaporator-crystallizer 11, the diverted portion of the clarified mother liquor being continuously treated with the required amount of sulfuric acid and continuously filtered to remove precipitated calcium sulfate and titanium dioxide therefrom in accordance with the practice of my invention. Alternatively, the clarified mother liquor from the first separator 12 being returned to the first evaporator-crystallizer 11 can be treated intermittently (say, once every few days) in its entirety with sulfuric acid, the entire stream of acidified mother liquor being filtered in accordance with by invention prior to being returned to the first evaporator-crystallizer. Or, if circumstances warrant a combination of both of the foregoing procedures can be employed.

The following example is illustrative but not limitative of the practice of my invention.

An acidic feed solution containing about 80 g./l. $Al_2O_3$ (present as $AlCl_3$), about 0.4 g./l. $Fe_2O_3$ (present as $FeCl_3$), about 0.3 g./l. CaO (present as $CaCl_2$), about 0.024 g./l. $TiO_2$ (present as $TiCl_4$) together with minor amounts of a variety of other metal chlorides is introduced into the first evaporator-crystallizer 11 where the solution is concentrated in accordance with the procedure described herein to precipitate high purity crystals of aluminum chloride hexahydrate therefrom. A portion of the mother liquor in the first evaporator-crystallizer 11 is essentially continuously withdrawn therefrom and introduced into the first separator 12 where the crystals of high purity aluminum chloride hexahydrate are separated from the clarified mother liquor. A portion of the clarified mother liquor (namely, about 8.6 liters of said clarified mother liquor for every 100 liters of feed solution introduced into the first evaporator-crystallizer 11) is withdrawn from the first separator 12 and is introduced into the second evaporator-crystallizer 14. The remainder of the clarified mother liquor from the separator 12 is returned to the first evaporator-crystallizer 11 as shown in the drawing. Similarly, a portion of clarified mother liquor from the second separator 15 (namely, about 2.5 liters of clarified mother liquor for every 100 liters of original feed solution) is bled therefrom and is discarded, the remainder of the clarified mother liquor being returned to the second evaporator-crystallizer 14 as indicated in the drawing. The impure aluminum chloride hexahydrate crystalline product recovered from the second separator 15 is recycled to the start of the process. After a period of substantially continuous operation during which time no sulfuric acid is added to the clarified liquor being returned to the first evaporator-crystallizer 11, the iron content of the mother liquor in the first evaporator-crystallizer increases from about 0.8 g./l. $Fe_2O_3$ to about 5 g./l. $Fe_2O_3$ (present as $FeCl_3$), the titanium content of the mother liquor increases from about 0.048 g./l. $TiO_2$ to about 0.34 g./l. $TiO_2$ and the calcium content of the mother liquor increases from about 0.6 g./l. CaO to about 4.25 g./l. CaO (present as $CaCl_2$).

Following the aforementioned period of continuous operation, a portion of the clarified mother liquor being returned from the first separator 12 to the first evaporator-crystallizer 11 is treated with an amount of sulfuric acid equivalent to that theoretically required to react with all of the calcium present in the clarified mother liquor being acidified. The thus treated mother liquor is then filtered as previously described to remove therefrom precipitated calcium sulfate and the fine particles of titanium dioxide present in the mother liquor as result of the hydrolysis of titanium chloride. The filtered clarified mother liquor is then returned to the first evaporator-crystallizer 11. After an additional period of substantially continuous operation during which time sulfuric acid is added to the clarified liquor being returned to the first evaporator-crystallizer 11, the titanium content of the mother liquor decreases from about 0.34 g./l. $TiO_2$ to about 0.30 g./l. $TiO_2$ (present as $TiCl_4$) and the calcium content of the mother liquor decreases from about 4.25 g./l. CaO to about 1.0 g./l. CaO (present in the mother liquor as $CaCl_2$).

From the foregoing description of my improvement in the process for producing high purity aluminum chloride hexahydrate it will be seen that I have made an important contribution to the art to which my invention relates.

I claim:

1. In the process wherein crystals of high purity aluminum chloride hexahydrate are precipitated and recovered from an aqueous solution of aluminum chloride containing minor amounts of other metal chlorides including ionized calcium chloride and titanium chloride, said process comprising (a) evaporating water from the main body of said solution to precipitate said crystals of high purity $AlCl_3 \cdot 6H_2O$ therefrom, (b) essentially continuously separating and recovering said precipitated crystals of $AlCl_3 \cdot 6H_2O$ from a portion of the main body of the solution and returning the thus clarified portion of the solution to the evaporation step of the process, (c) essentially continuously adding fresh aluminum chloride-containing solution to the main body of the solution being evaporated and (d) essentially continuously withdrawing a portion of the solution being evaporated from the main body of said solution so as to maintain the concentration of metal chlorides other than calcium chloride in said main body below a predetermined value, the improvement which comprises simultaneously removing calcium ions and titanium dioxide (present in the solution as a result of the hydrolysis of titanium chloride) from the solution by the steps comprising (i) adding sulfuric acid to the clarified solution being returned to the evaporation step of the process, (ii) filtering said acidified clarified solution to remove precipitated calcium sulfate and titanium dioxide therefrom and (iii) returning the filtered clarified solution to the main body of the solution being evaporated.

2. The process according to claim 1 in which the amount of sulfuric acid added to the clarified solution is between about 10% and 95% of the amount of said acid theoretically required to react with all of the calcium present in the clarified solution being acidified.

3. The process according to claim 1 in which the sulfuric acid is added intermittently to the clarified solution being returned to the evaporation step of the process.

4. The process according to claim 1 in which the sulfuric acid is added essentially continuously to the clarified solution being returned to the evaporation step of the process.

5. The process for simultaneously removing dissolved calcium ions and normally unfilterable particles of titanium dioxide from a saturated aqueous solution of aluminum chloride, said calcium ions being present in said solution in the form of calcium chloride and said titanium dioxide being present in said solution as a result of the hydrolysis of titanium chloride, said process comprising adding sulfuric acid to said aqueous solution to precipitate the calcium content thereof in the form of calcium sulfate which acts as a filter aid for the normally unfilterable particles of titanium dioxide, and filtering said acidified solution to remove said precipitated calcium sulfate and said particles of titanium dioxide concurrently therefrom.

6. The process according to claim 5 in which the amount of sulfuric acid added to the solution is between about 10% and 95% of the amount of said acid theoretically required to react with all of the calcium present in the solution being acidified.

7. The process according to claim 5 in which the sulfuric acid is added intermittently to the solution being returned to the evaporation step of the process.

8. The process according to claim 5 in which the sulfuric acid is added essentially continuously to the solution being returned to the evaporation step of the process.

References Cited

UNITED STATES PATENTS

| | | | |
|---|---|---|---|
| 879,603 | 2/1908 | Wallerstein | 23—122 |
| 1,906,730 | 5/1933 | Washburn et al. | 23—122 XR |
| 1,934,778 | 11/1933 | Teichmann | 23—117 |
| 1,967,235 | 7/1934 | Ferkel | 23—202 |
| 2,018,955 | 10/1935 | Heckert | 23—122 |
| 2,990,249 | 6/1961 | Wagner | 23—202 XR |
| 3,148,024 | 9/1964 | Hayes | 23—92 |
| 3,311,452 | 3/1967 | Goodgame et al. | 23—202 |

FOREIGN PATENTS

| | | |
|---|---|---|
| 655,617 | 7/1951 | Great Britain. |

EDWARD STERN, *Primary Examiner.*

US. Cl. XR.

23—87, 122, 142, 202; 210—75